March 6, 1962  P. J. MOORE  3,024,295
IMMERSION PYROMETER WITH NON-DIRECTIONAL CONTACT STRUCTURE
Filed June 16, 1959  2 Sheets-Sheet 1

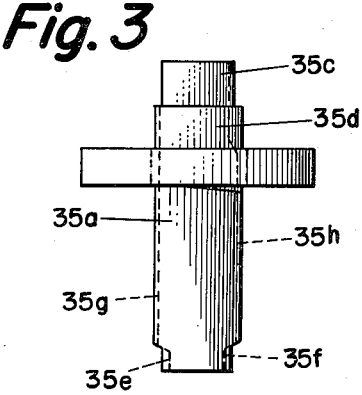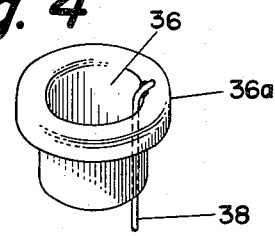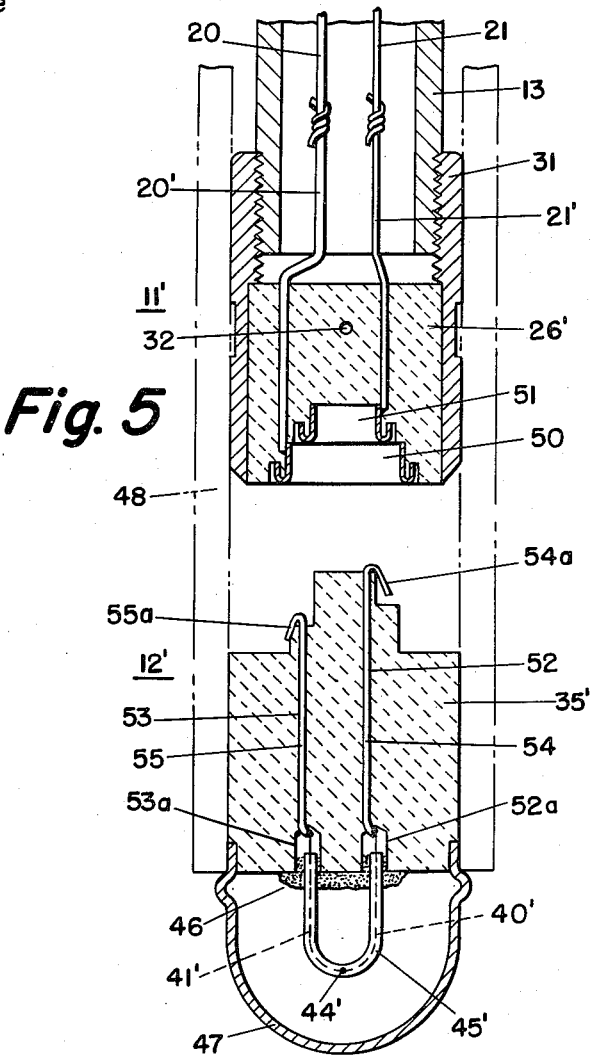

United States Patent Office

3,024,295
Patented Mar. 6, 1962

3,024,295
IMMERSION PYROMETER WITH NON-DIRECTIONAL CONTACT STRUCTURE
Philemon J. Moore, Jenkintown, Pa., assignor to Leeds and Northrup Company, Philadelphia, Pa., a corporation of Pennsylvania
Filed June 16, 1959, Ser. No. 820,732
8 Claims. (Cl. 136—4)

This invention relates to immersion pyrometers of the type including plug-in temperature sensing units and has for an object the provision of an immersion pyrometer including a manipulator section and an expendable plug-in sensing section provided with non-directional contact structure.

Immersion pyrometer systems utilizing expendable temperature sensing units such as expendable thermocouple units enable the sensing unit to be used only once and then discarded. Systems of this type are disclosed in the copending application of Harold G. Mead, Serial No. 736,947 filed May 14, 1958, now Patent No. 2,999,121, and in copending application Serial No. 760,332 filed September 11, 1958 by Donald Robertson and Raymond W. Ross. The use of expendable temperature sensing units such as thermocouple units has become increasingly important, particularly in the measurement of the temperature of molten metals where the temperature is detected by immersing the measuring or hot junction of a thermocouple device in the bath of molten metal and allowing it to remain until the thermocouple reaches the temperature of the bath. In such use, due to the high temperatures and the nature of the molten metal, non-expendable thermocouples are subject to change of calibration through contamination and, unless frequently checked for accuracy, may give results that are seriously inaccurate. Such inaccuracy is eliminated by using expendable, low-cost, prefabricated thermocouple units which may be easily and rapidly connected, a new one, for each measurement and, after immersion in the bath of molten metal and the taking of the measurement, be discarded.

Expendable thermocouple units are adapted to be connected to the lower end of a holder or manipulator and the problem of electrically connecting such units to their holders is a difficult one due to the adverse conditions encountered in molten metal immersion pyrometry. It is necessary when a thermocouple is used to provide the manipulator and expendable plug-in sensing unit with polarized mating contact means that will withstand being heated to temperatures in the vicinity of 1000° F. and still provide positive electrical contacting qualities. In the past, the proper polarity between the manipulator section and the plug-in section has been maintained by the use of a key or other similar locating structure. This required that the plug-in temperature sensing unit be disposed in a particular position relative to the axis of the device in order for the two sections to be mechanically and electrically coupled.

In general use the manipulator is normally several feet long, for example in the order of eight feet, and the lower half of the manipulator is adapted to be encased in a long paper tube that protects the manipulator from the molten metal bath and provides heat insulation as well as making it easy to remove slag and prevent slag encrustation. To assemble the plug-in temperature sensing unit on the lower end of the manipulator, the plug-in temperature sensing unit is first inserted in the lower end of the paper tube and the opposite end of the paper tube is then slipped over the lower end of the manipulator which contains the mating contact structure for the plug-in temperature sensing unit. When a key-type locating arrangement is employed, the key is hidden from view of the operator; thus the operator must rely upon indicator marks and finally the "feel" between the plug-in temperature sensing unit and the manipulator section to ascertain that the parts are in proper alignment for engagement of the contact structures. This operation is difficult and time-consuming and frequently results in breakage of the temperature sensing units or the contact structure in the immersion end of the manipulator section.

Accordingly, it is an object of the present invention to provide an immersion pyrometer device with cooperating nondirectional polarized contact structure on the manipulator section and the plug-in temperature sensing section which enables the two sections to be readily electrically and mechanically connected without regard to the angular disposition of the sections relative to the longitudinal axis of the assembled immersion pyrometer device.

It is a further object of the invention to provide an immersion pyrometer device with non-directional polarized contact structure which is self-cleaning by reason of a wiping action which results during the assembly and disassembly of the two sections of the device and one in which the contact pressure resulting from engagement of the mating contacts on the two sections is adequate to support the plug-in temperature sensing section on the lower end of the manipulator section during immersion thereof.

It is a further object of the invention to provide an immersion pyrometer device with non-directional contact structure which is sufficiently inexpensive to produce so that the plug-in temperature sensing unit may be discarded after each measurement.

In accordance with the present invention there is provided an immersion pyrometer device including a manipulator section and an expendable plug-in temperature sensing section. A pair of spaced electrical contacts is provided on one of the sections and a pair of spaced electrical contacts is provided on the other of the sections adapted to engage the first pair characterized by one contact in each cooperating pair surrounding the longitudinal axis of the device through an angle of 360° to provide continuity of electrical connections between the manipulator section and the plug-in temperature sensing section regardless of the angular disposition of the sections about the longitudinal axis of the device. In a preferred form of the invention the cooperating pairs of contacts include ring structures displaced longitudinally of the axis of the device.

For further objects and advantages of the invention, reference may be had to the following description taken in conjunction with the accompanying drawings in which:

FIG. 3 is an elevation view of the core of the expendable thermocouple unit shown in FIG. 2;

FIG. 4 is a perspective view of one of the contact rings shown in FIG. 2; and

FIG. 5 is an exploded sectional view similar to FIG. 2 of a modification of the invention.

Figure 1:
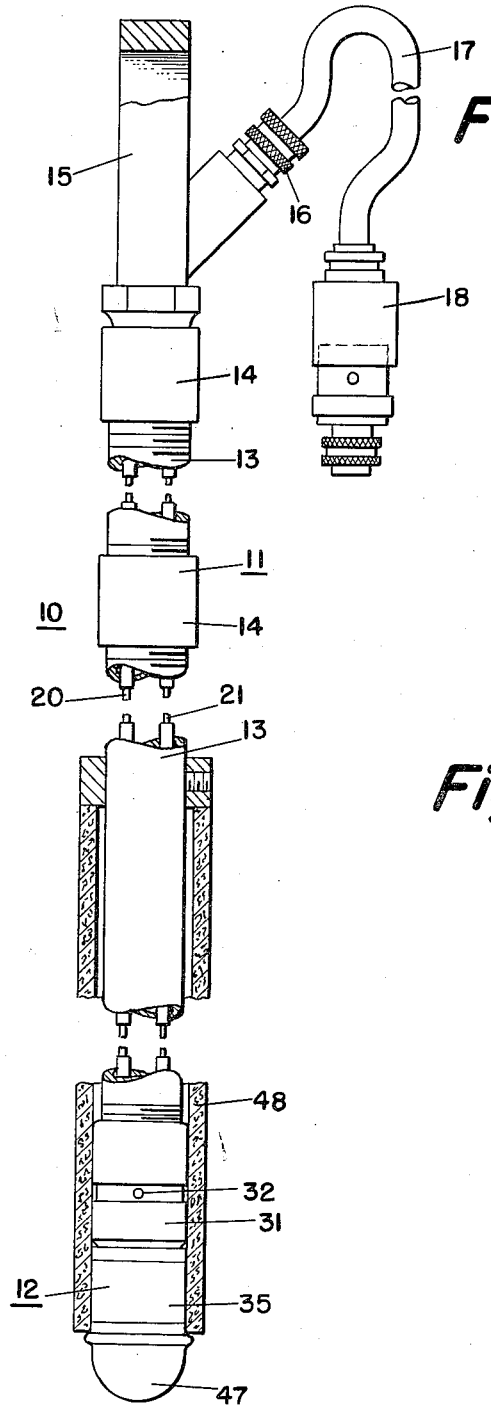
FIG. 1 is an elevational view partially in section with certain parts broken away showing one embodiment of the invention.

Referring to FIG. 1, the invention has been shown as applied to an immersion pyrometer device 10 which includes a manipulator section 11 and an expendable plug-in temperature sensing section or unit 12. The manipulator section 11 may be of any desired length but for use in measuring temperature in a furnace is preferably several feet long and is made up of a plurality of steel pipe sections 13 which are threaded at their ends and are adapted to be joined together by coupling members 14. The outer end of the manipulator 11 which is adapted to be held by the operator is provided with a handle 15 having a bushing 16 extending from one side thereof through which the electrical cable 17 passes. The other end of the cable 17 is provided with a suitable electrical connector 18 for connection of the pyrometer device to a temperature-measuring system. Such systems are well-known in the art and thus it is not believed necessary to illustrate them here. The outside of the electrical cable 17 is encased in suitable insulation, such as rubber or plastic, extending between the bushing 16 and the connector 18. The extension wires 20 and 21, which are inside the cable 17, are insulated from each other through the length of the manipulator section 11 by means of individual insulating sleeves such, for example, as woven glass tubing.

Figure 2:
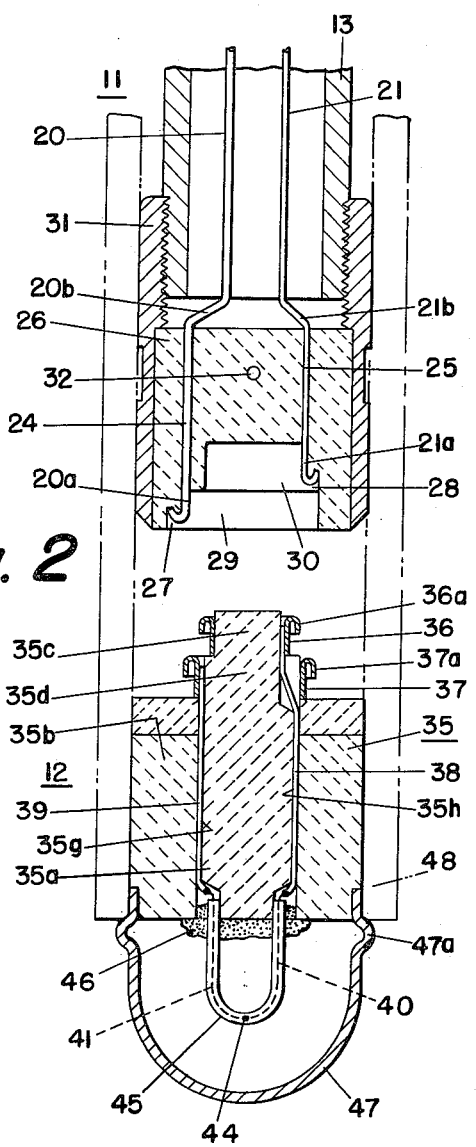
FIG. 2 is an exploded fractional sectional view of the immersion end of the manipulator section and an expendable thermocouple comprising the sensing section showing in detail one form of the electrical connector which may be employed in FIG. 1.

At the lower or immersion end of the manipulator section 11, as shown in FIG. 2, two bare portions of the lead wire 20 and 21 are threaded through passages 24 and 25 in an electrical insulator member or contact block 26. The insulator 26 may be formed from any suitable insulating material such as ceramic, wood, Bakelite or equivalent and is provided with recesses or grooves 27 and 28 for receiving bent ends of the respective lead wires 20 and 21. It will be noted that the grooves 27 and 28 are disposed respectively in concentric counterbores 29 and 30. The counterbores 29 and 30 are spaced axially of the manipulator section 11 and thus provide separation of the contact portions 20a and 21a of the lead wires 20 and 21. At the opposite end of the insulator 26 portions of the extension wires 20 and 21 are bent at 20b and 21b to cooperate with the bent terminal or contact portions 20a and 21a for holding the extension wires firmly in position against the insulator 26 in avoidance of longitudinal or axial displacement of the extension wires when the plug-in section 12 is inserted into the contact block 26 as set forth in the above-mentioned application, Serial No. 760,332. The contact block is adapted to be secured to the lower end of the manipulator section 11 by means of a contact block mounting coupling 31 and a pin 32 which extends through a transverse passage in the block 26 and through aligned openings in the walls of the mounting coupling 31. The upper end of the mounting coupling 31, as shown in FIG. 2, is provided with female threads for engaging male threads on the lower end of the pipe section 13.

The expendable plug-in temperature sensing section 12, in the form illustrated, includes an insulating body 35 which may be made from any suitable material similar to those mentioned above for contact block 26 or as disclosed in the aforesaid copending application Serial No. 736,947. The body 35 comprises a pair of sections 35a and 35b. Section 35a is in the form of a central core which is adapted to be surrounded by a sleeve section 35b. As may be seen in FIG. 3, the core section 35a is provided at one end with round projecting structure which includes portions 35c and 35d which are adapted to be received within the respective counterbores 30 and 29 in contact block 26. The projecting portions 35c and 35d form the supports for a pair of short tubular members or rings 36 and 37 respectively which extend through an angle of 360°. Each of the rings 36 and 37 is round and has a rolled edge 36a, 37a which is adapted to engage the walls of the respective counterbores 30 and 29 and be deformed upon engagement with their respective cooperating contact structures 21a and 20a of the lead wires 21 and 20. The contact rings 36 and 37 are respectively connected by way of lead structures 38 and 39 to the respective ends of thermocouple elements 40 and 41. The thermocouple elements 40 and 41 are joined together at their opposite ends to form a heat-responsive or measuring junction 44. The elements 40 and 41, including the measuring junction 44, are enclosed within a thin-walled sheath 45 of heat refractory material such as silica or quartz. Such materials have the well-known properties of being electrically-insulating as well as heat-transmitting. The thermocouple construction, including the protective tubing is more fully described and claimed in the aforementioned co-pending application Serial No. 736,947, now Patent No. 2,999,121. The free ends of the tube 45, FIG. 2, extend into recesses 35e and 35f, FIG. 3. These recesses 35e and 35f are disposed at the lower end of grooves 35g and 35h which extend lengthwise of the core section 35a and are adapted to receive the lead structures 38 and 39, FIG. 2. The lead structures 38 and 39 are adapted to be assembled with their respective rings 36 and 37, FIG. 2, in the manner indicated in FIG. 4 by ring 36 and lead 38.

In assembly, the lead wires 38 and 39 are placed in the grooves 35h, 35g on the core section 35a and the ends of the lead wires 38 and 39 extend in the shallow grooves along the sides of the round projections 35c and 35d. The rings 36 and 37 are then placed on the projections 35c and 35d over the ends of the respective lead wires 38 and 39. The rings 36 and 37 may have a pressed fit on the projections and hold the respective ends of the lead wires 38 and 39 in place by friction or the lead wires may be mechanically secured to the rings as by soldering or other suitable means. After the lead wires 38 and 39 have been connected to the rings 36 and 37, and to their respective thermocouple elements 40 and 41, the sleeve section 35b of body 35 is slipped over the core section 35a and the two sections of body 35 are joined as by suitable cement 46, FIG. 2. The cement 46, in addition to holding the body sections 35a and 35b together, also seals the free ends of the tube 45 within the body 35 and prevents ingress of metal when the unit 12 is immersed in the molten bath during measurement.

For a noble metal thermocouple the conductors or lead wire structures 20 and 21 are selected to be of compensating extension lead wire material for the thermocouple so that the effective reference junctions for the measuring system will be at the measuring instrument. The contact rings 36 and 37 likewise are made of compensating material in order to preserve continuity of the thermocouple circuit. Those skilled in the art will understand that if the element 41 be of platinum and the element 40 be of an alloy of platinum plus ten percent rhodium, the extension wire 20 will comprise an alloy of essentially nickel and copper (approximately 98% copper, 1% nickel, .5 to .75% manganese and miscellaneous impurities) and the extension wire 21 will be made of copper. The contact rings 37 and 36 are made of the same alloy as that used in the corresponding compensating extension wires 20 and 21. Such materials are soft and substantially springless. When thermocouples of other materials are utilized, the extension wires and the contacts are correspondingly changed to provide the desired results.

As will be seen in FIG. 2, the contact structure 21a, 20a on the manipulator section 11 and the contact structure 36, 37 on the plug-in temperature sensing section 12 are such that the section 12 may be readily mechanically and electrically connected to the section 11 regardless of the relative angular dispositions of the sections about the longitudinal axis of the pyrometer device 10. The sections 11 and 12 are not only readily coupled together at any angle, but when coupled, will provide the required polarized electrical connection between the cooperating pairs. The contact rings 36 and 37 being deformable around their entire 360° circumference may be dimensioned so as always to engage the sides of the counterbores 29 and 30 to provide a tight friction grip therewith. Additionally, the rings 36 and 37 by being soft and thus further deformable upon engagement with the contact wires 21a and 20a provide a good mechanical contact and a wiping action therebetween resulting in good electrical contact. The electro-mechanical connection of the mating contacts remains firm as long as the sections 11 and 12 remain coupled.

To protect the thermocouple assembly 40, 41, there is provided a metal cap 47 attached to the lower end of the body 35, FIGS. 1 and 2. The metal cap 47 is rigidly secured to the body 35 and forms an integral part of the plug-in temperature sensing unit 12. The cap 47 not only prevents mechanical injury to the thermocouple assembly during shipment and handling, but also protects the assembly from the slag floating on the top of a molten bath, such as molten steel, all as described more fully in said aforementioned co-pending applications. The cap 47 is provided with a flange 47a which extends around the circumference of the cap and forms a shoulder which is engaged by the lower end of a cardboard or paper protection tube 48 disposed on the lower end of the manipulator section 11, FIG. 1. The heavy paper sleeve 48 provides heat insulation for the plug-in contacts, retards deterioration of the pipe 13 and makes easier the removal of slag encrustation. The sleeve 48 may be of paper about ¼" thick and is expendable along with the plug-in temperature sensing unit 12.

Referring to FIG. 5, there is shown a modification of the invention in which the contact structures on the manipulator section 11' and the plug-in temperature sensing section 12' have in effect been reversed. The manipulator section 11' is provided with an insulator block 26' having concentric counterbores which are adapted to receive contact rings 50 and 51. The rings 50 and 51 are adapted to be soldered to their respective lead wires 20 and 21. The lead wires 20 and 21 may include spliced extensions 20', 21', for ease in assembly. The rings 50 and 51 are of similar construction to the contact rings 37 and 36 previously described. The rings 50 and 51 may be molded into the contact block 26' or retained therein by a pressed fit.

The expendable plug-in sensing section 12' includes a body member 35' having a pair of passages 52 and 53 extending therethrough for lead wires 54 and 55. The lead wires 54 and 55 are made of the same soft, springless material as the corresponding lead wires 21 and 20 and the upper ends of the wires are provided with bent portions 54a and 55a to provide contact structure for mating with the corresponding contact rings 51 and 50. The lower ends of the lead wires 54 and 55 are connected to the respective ends of thermocouple elements 40' and 41' with their ends being joined to provide the measuring junction 44'. The passages 52 and 53 are provided with counterbores 52a and 53a at their lower ends to receive the corresponding ends of the refractory tube 45' which encases the thermocouple unit. It will be noted that the lead wires 54 and 55 may be assembled with the thermocouple unit and the lead wires then passed through their respective openings 52 and 53 in the body member 35'. The exposed ends of the lead wires 54 and 55 are bent and cut to length to provide the contact structure 54a and 55a. The bent portions 54a and 55a are not completely collapsed or deformed during manufacture and thus are further deformable to provide a friction grip with the mating ring contacts 51 and 50 when the sensing unit 12' is plugged into the manipulator section 11'. From the foregoing it will be seen that the body member 35' may be constructed in one piece rather than of two-piece construction as is shown in the modification illustrated in FIG. 2. However, if the thermocouple unit is to be assembled to the lead wires 54 and 55 after they have been inserted in the body member 35', then it is necessary to make the body member 35' in two sections similar to that shown in FIG. 2.

From the foregoing description it will be seen that the present invention provides an immersion pyrometer device in which the manipulator section and plug-in temperature sensing section thereof may be readily assembled regardless of their angular disposition about the longitudinal axis of the device and at the same time provide the proper electrical connection between the sections. The contact structures are inexpensive and do not require adherence to close tolerances in manufacture.

It should be understood that the invention is not limited to the specific arrangements and that changes and modifications may be made within the scope of the appended claims.

What is claimed is:

1. An immersion pyrometer device for measuring the temperature of a bath of molten material comprising a manipulator section having a pair of leadwires extending therethrough to the lower end thereof, a first pair of spaced electrical contacts connected to said leadwires and supported by said lower end of said manipulator section, an expendable plug-in temperature sensing section including body structure of electrical and heat-insulating material which will withstand immersion in the bath of molten material the temperature of which is to be measured, a thin-walled sheath of electrically insulating and heat-transmitting refractory material sealed to one end of said body structure and cooperating therewith to form an enclosure for heat-responsive means, heat-responsive means located within said enclosure, a second pair of electrical contacts supported by said body structure at the other end thereof and connected to said heat-responsive means and engaging said first pair of contacts, one contact in each cooperating pair surrounding the longitudinal axis of said device through an angle of 360° to provide continuity of electrical connection between said manipulator section and said plug-in sensing section regardless of the angular disposition of said sections about said longitudinal axis of said device, and an outermost sleeve of heat-insulating material slidable with respect to said device and covering the joint between said manipulator section and said plug-in temperature sensing section.

2. An immersion pyrometer device according to claim 1 characterized by said cooperating pairs of contacts including ring structures displaced longitudinally of said axis.

3. An immersion pyrometer device according to claim 1 characterized by one of said pairs of contacts on one of said sections comprising spaced ring structures.

4. An immersion pyrometer device according to claim 1 wherein said plug-in section comprises a core section supporting one pair of said contacts in electrical connection with a sensing element, and a sleeve adapted to surround said core.

5. An immersion pyrometer device for measuring the temperature of a bath of molten material comprising a manipulator section having a pair of leadwires extending therethrough to the lower end thereof, a first pair of spaced electrical contacts connected to said leadwires and supported by said lower end of said manipulator section, an expendable plug-in temperature sensing section including body structure of electrical and heat-insulating material which will withstand immersion in the bath of molten material the temperature of which is to be measured, a thin-walled sheath of electrically insulating and heat-transmitting refractory material sealed to one end of said body structure and cooperating therewith to form an enclosure for heat-responsive means, heat-responsive means located within said enclosure, a second pair of electrical contacts supported by said body structure at the other end thereof and connected to said heat-responsive means and engaging said first pair of contacts, one contact in each cooperating pair surrounding the longitudinal axis of said device through an angle of 360° to provide continuity of electrical connection between said manipulator section and said plug-in sensing section regardless of the angular disposition of said sections about said longitudinal axis of said device, and at least one contact in each cooperating pair being of a material which is substantially springless and soft and further deformable upon engagement with its cooperating contact to provide frictional gripping action between said contacts adequate to support said plug-in temperature-sensing section on the lower end of said manipulator section during immersion thereof.

6. An immersion pyrometer device according to claim 5 wherein said second pair of contacts comprise ring structure.

7. An immersion pyrometer device according to claim 5 characterized by one of said pairs of contacts comprising ring structure and the other of said pairs of contacts comprising wire structure adapted for slideable engagement with said ring structure.

8. An immersion pyrometer device for measuring the temperature of a bath of molten material comprising a manipulator section having a pair of leadwires extending therethrough to the lower end thereof, a first pair of spaced electrical contacts connected to said leadwires and supported by said lower end of said manipulator section, an expendable plug-in temperature sensing section including body structure of electrical and heat-insulating material which will withstand immersion in the bath of molten material the temperature of which is to be measured, a thin-walled sheath of electrically insulating and heat-transmitting refractory material sealed to one end of said body structure and cooperating therewith to form an enclosure for heat-responsive means, heat-responsive means located within said enclosure, a second pair of electrical contacts supported by said body structure at the other end thereof and connected to said heat-responsive means and engaging said first pair of contacts, one contact in each cooperating pair comprising a ring of soft springless deformable tubular material surrounding the longitudinal axis of said device through an angle of 360° to provide continuity of electrical connections between said manipulator member and said plug-in sensing member regardless of the angular disposition of said members about said longitudinal axis of said device.

References Cited in the file of this patent
UNITED STATES PATENTS

| | | |
|---|---|---|
| 1,241,496 | Chubb | Oct. 2, 1917 |
| 2,097,370 | Hayashi | Oct. 26, 1937 |
| 2,463,427 | Richards | Mar. 1, 1949 |